US007644977B2

(12) United States Patent
Drews

(10) Patent No.: US 7,644,977 B2

(45) Date of Patent: Jan. 12, 2010

(54) POST PRESSURIZING MATERIAL TREATMENT FOR BODIES MOVING THROUGH FLUID

(76) Inventor: Hilbert F. P. Drews, 5640 S. 76th St., Greendale, WI (US) 53129

( * ) Notice: Subject to any disclaimer, the term of this patent is extended or adjusted under 35 U.S.C. 154(b) by 262 days.

(21) Appl. No.: 11/876,165

(22) Filed: Oct. 22, 2007

(65) Prior Publication Data

US 2008/0054678 A1 Mar. 6, 2008

Related U.S. Application Data

(63) Continuation-in-part of application No. 11/396,793, filed on Apr. 3, 2006, now Pat. No. 7,357,442, which is a continuation-in-part of application No. 11/005,056, filed on Dec. 6, 2004, now Pat. No. 7,059,662.

(51) Int. Cl.
*B62D 35/00* (2006.01)

(52) U.S. Cl. .................................................. 296/181.5

(58) Field of Classification Search .............. 296/181.5, 296/180.1, 180.2, 180.3, 180.4, 180.5; 180/903; 244/130

See application file for complete search history.

(56) References Cited

U.S. PATENT DOCUMENTS

| | | | | |
|---|---|---|---|---|
| 1,903,823 | A * | 4/1933 | Lougheed | 244/200 |
| 1,909,186 | A | 5/1933 | Lougheed | |
| 2,322,632 | A | 6/1943 | Harper Jr. | |
| 4,650,138 | A | 3/1987 | Grose | |
| 4,682,808 | A * | 7/1987 | Bilanin | 296/180.4 |
| 5,108,145 | A | 4/1992 | Harris | |
| 5,133,516 | A | 7/1992 | Marentic et al. | |
| 5,289,997 | A | 3/1994 | Harris | |
| 5,449,136 | A * | 9/1995 | Doria Iriarte | 244/199.1 |
| 5,764,782 | A * | 6/1998 | Hayes | 381/160 |
| 6,276,636 | B1 * | 8/2001 | Krastel | 244/130 |
| 6,412,853 | B1 | 7/2002 | Richardson | |
| 6,454,219 | B1 | 9/2002 | Moe | |
| 6,789,769 | B2 | 9/2004 | Mau et al. | |
| 7,059,662 | B1 * | 6/2006 | Drews | 296/180.1 |
| 7,357,442 | B1 * | 4/2008 | Drews | 296/180.1 |

* cited by examiner

*Primary Examiner*—H Gutman

(74) *Attorney, Agent, or Firm*—Andrus, Sceales, Starke & Sawall, LLP

(57) ABSTRACT

A post pressurizing material treatment for bodies moving through fluid includes a series of compartments joined to the rear surface of the body. Each compartment is sealed by a top wall, a bottom wall, a pair of side walls and a front wall and is open at a rear end thereof. Each compartment retains at least one V-shaped base having diverging walls opening into the rear end of each compartment. Post pressurizing material is secured in a spaced between the walls of the V-shaped base for trapping fluid flow and accumulating forward pressure between the walls of the V-shaped base so as to reduce drag and propel the body forward.

5 Claims, 9 Drawing Sheets

FIG. 9
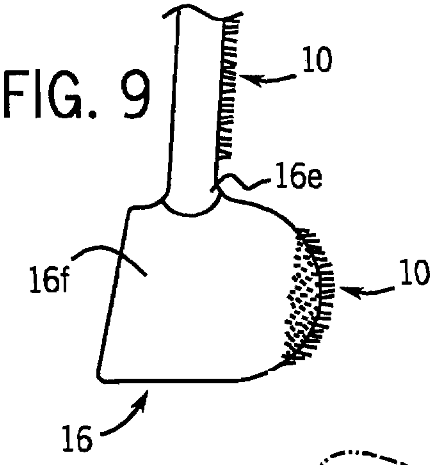
FIG. 10
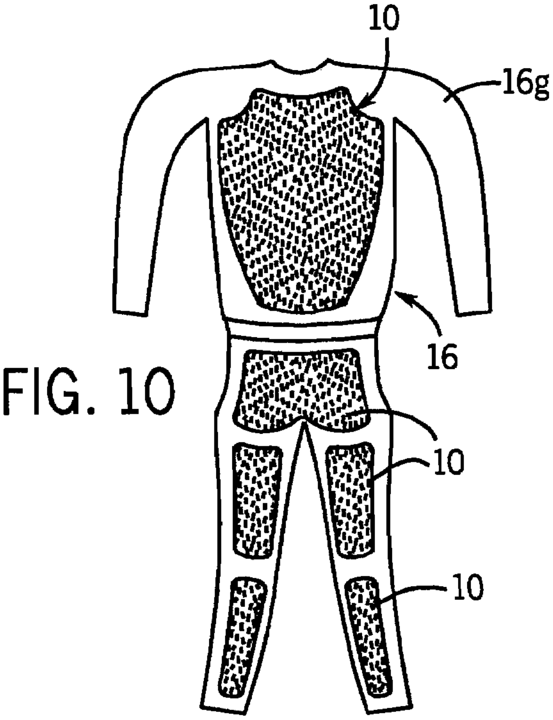
FIG. 11
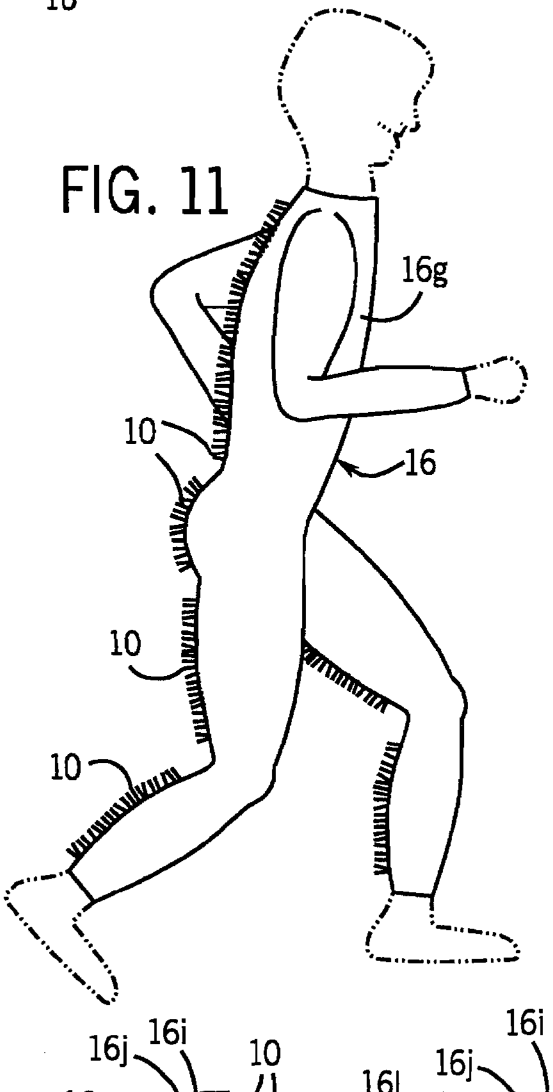
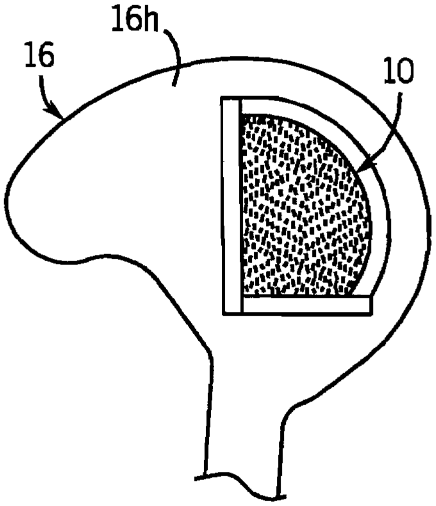
FIG. 12
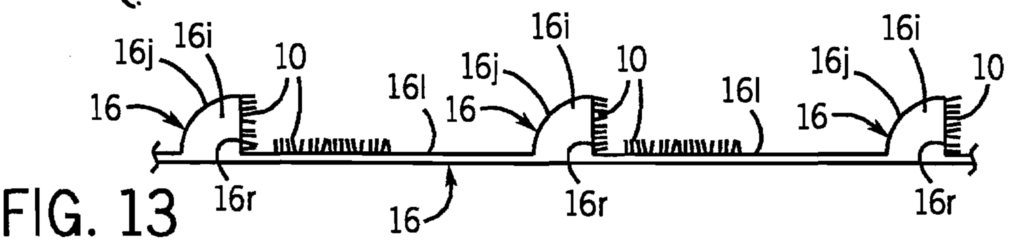
FIG. 13

FIG. 14
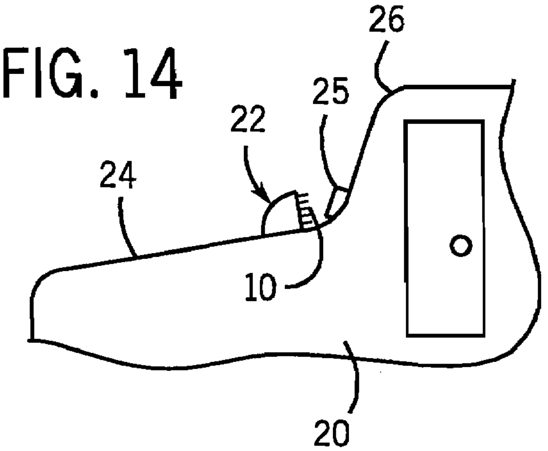
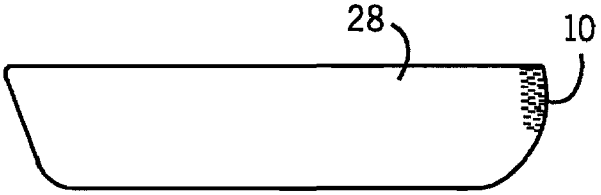
FIG. 15
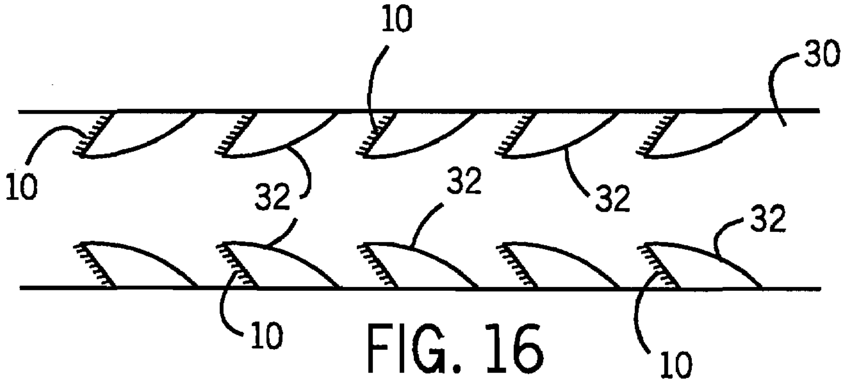
FIG. 16
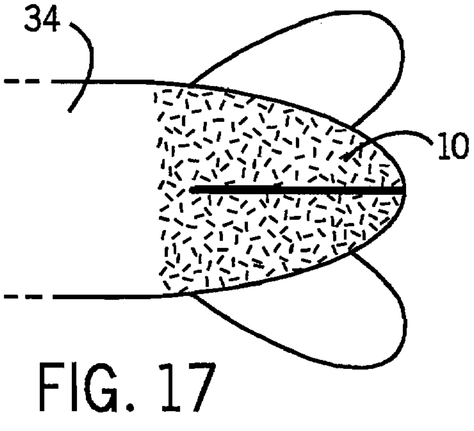
FIG. 17
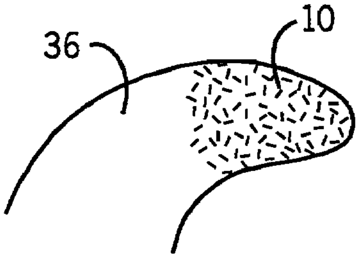
FIG. 18

FIG. 20
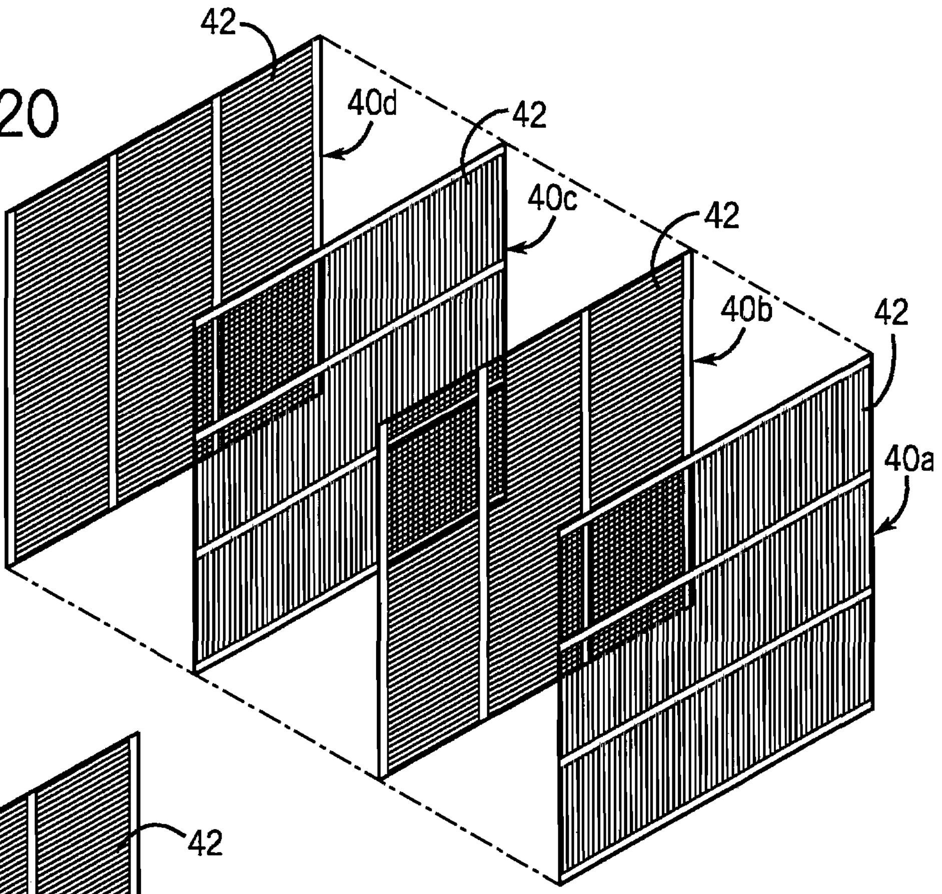
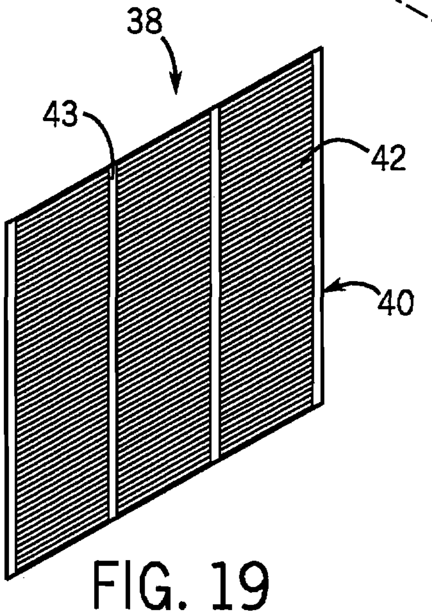
FIG. 19
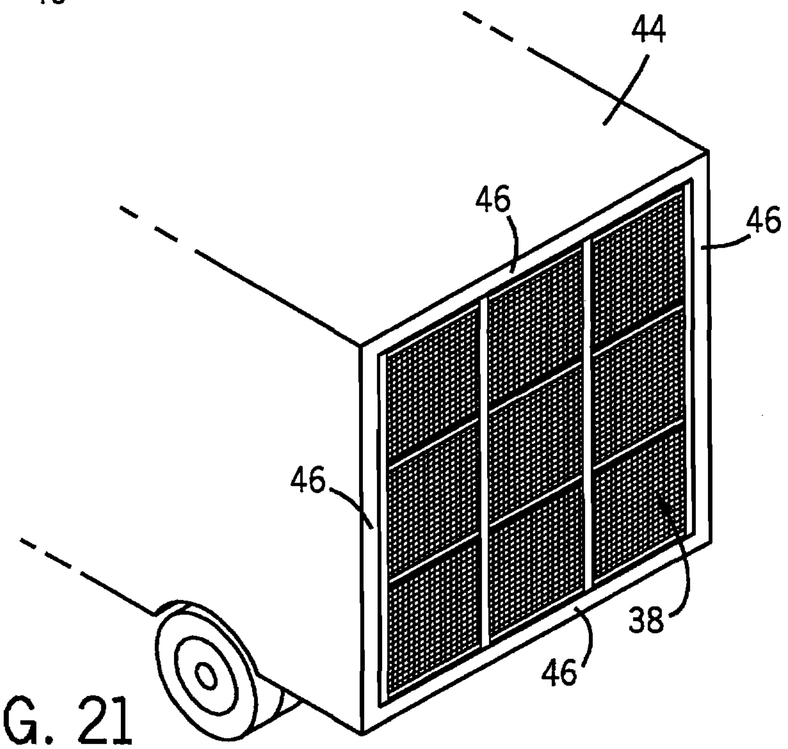
FIG. 21

POST PRESSURIZING MATERIAL TREATMENT FOR BODIES MOVING THROUGH FLUID

CROSS-REFERENCE TO RELATED APPLICATIONS

This application is a continuation-in-part of U.S. patent application Ser. No. 11/396,793, filed Apr. 3, 2006, now U.S. Pat. No. 7,352,442 which is a continuation-in-part of U.S. patent application Ser. No. 11/005,056 filed Dec. 6, 2004, now U.S. Pat. No. 7,059,662, issued Jun. 13, 2006.

FIELD OF THE INVENTION

This invention relates generally to additions made to the surface construction of a body for improving the movement of the body through a fluid medium. More particularly, the invention pertains to a post pressurizing material for reducing drag and applying supplemental propulsion to the rear surface of the body moving through fluid.

BACKGROUND OF THE INVENTION

Various surface configurations are known for reducing drag and/or creating various forces on the surface of a moving body such as an automobile, truck, boat, airplane or other devices having a surface which moves through air or water. Because of the ever-present energy crisis, there continues to be a demand for practical constructions which will more fully promote the efficient, fluid-resisted movement of such vehicles and other devices.

In a round, perfectly symmetrical aerodynamic body traveling through the air, pressure builds up on a forward half of the body as air impacts thereon. Simultaneously, the area on the rearward half of the body becomes evacuated so that there is a large difference in pressure on the surface. Energy needed to continually move the body requires a force to overcome the frontal pressure plus the lack of rearward pressure. Consider now, how much air is dragged along a so-called "streamlined" automobile having a rectangular shape, rough sub area, revolving wheels, wheel wells, hood and windshield, rear deck lamp, a vertical rear end, bumpers, etc. In such case, there is a huge forward pressure dragging along a large volume of air in addition to a large suction area with competing low pressure. It is contemplated that providing surface treatment that will retain air pressure on certain surfaces will substantially reduce the tremendous amount of drag encountered by the rear portions of vehicles and other bodies moving through air. Such provision is inspired by the efficient design of the posterior of a bird that converts swirling wind into a forward push instead of a suction drag.

A similar scenario applies to bodies moving through water.

SUMMARY OF THE INVENTION

The present invention is particularly directed to strategically providing a rear surface of a body moving through fluid with a post pressurizing material in such a manner as to more effectively promote the efficient movement of the body through the fluid with significant drag reduction and an increased forward propulsion.

In accordance with the invention, the post pressurizing material is preferably embodied in a collection of dense, flexible elements oriented generally perpendicularly and extending from a flexible mounting base which can be attached to the rear surface of the body. The element collection has the ability to entrap fluid flow and accumulate pressure therein so that, in applied form, it will reduce drag and simultaneously push or propel the body to which rear surface it is attached into the fluid.

In a preferred embodiment of the invention, the element collection takes the form of a fur or fur-like mass comprised of a "forest" of soft, substantially round, fine elements free to bend in all directions when subjected to air currents. In another embodiment, the elements may be constructed of a flat, textured paint applicator having a plurality of short, soft cloth or synthetic bristles. In a different version, the elements include a maze of curly, intertwined clusters made of plastic which would be durable and washable such as with a hose. In still another form, the elements are constructed of a plastic or nylon net in several layers.

In another embodiment of the invention, the post pressurizing material is in the form of a layered system of gridwork attached to the rear of a body with a peripheral space extending around the gridwork. The gridwork traps fluid flow and accumulates pressure therein so as to reduce drag and simultaneously propel the body forward. The gridwork is preferably comprised of at least two back-to-back screens which have air deflecting members that are alternately oriented relative to each other when in back-to-back formation.

In another aspect of the invention, a body moves through fluid and has a front surface accumulating positive pressure and a rear surface developing a negative pressure as fluid impacts upon the body creating significant drag thereon. The invention is improved by a series of compartments joined to the rear surface of the body. Each compartment is sealed by a top wall, a bottom wall, a pair of side walls, a front wall and is open at a rear end thereof. Each compartment retains at least one V-shaped base having diverging walls opening into the rear end of each compartment. Post pressurizing material is secured in a space between the walls of the V-shaped base for trapping fluid flow and accumulating forward pressure between the walls of the V-shaped base so as to reduce drag and propel the body forward.

It is a general object of the present invention to provide a post pressurizing material on the rear portion of a body in order to markedly enhance the fluid dynamic motion thereof.

It is one object of the present invention to provide a post pressurizing material on the rear surface of the vehicle such as an automobile, van, truck, SUV, bus, airplane, boat or the like propelled through air in such a manner so as to decrease drag and simultaneously improve fuel consumption.

It is an additional object of the present invention to provide a post pressurizing material on the rear surface of certain sporting goods, such as a golf club and its shaft, which are vigorously driven through the air.

It is a further object of the present invention to provide a post pressurizing material on the rear surface of outerwear worn by skaters, runners, bicyclists, motorcyclists and others moving through air.

It is another object of the present invention to provide a post pressurizing material on the rear area of various blade surfaces moving through air.

It is also an object of the present invention to provide a post pressurizing material on the posterior of an aerodynamic element already being utilized to improve aerodynamic motion on a moving body.

Yet another object of the present invention is to provide a post pressurizing material on the rear area of a body moving through water.

Still another object of the present invention is to provide a compartmentalized arrangement of post pressurizing material located between walls of a V-shaped base.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 9 is a partial side view of the rear surface of a golf shaft and club having the post pressurizing material applied thereto;

FIG. 10 is a rear view of an athletic suit or outerwear provided with post pressurizing material;

FIG. 11 is a side view of a runner wearing the outerwear of FIG. 10;

FIG. 12 is a partial side view of the rear surface of a blade provided with post pressurizing material;

FIG. 13 is a series of spaced apart, interconnected aerodynamic elements having post pressurizing material applied to their rear surfaces;

FIG. 14 is a side elevational view of a motor vehicle having the rear surface of a single enlarged aerodynamic element provided with a post pressurizing material and placed in front of the vehicle windshield;

FIG. 15 is a side elevational view of the rear upper surface of a boat provided with a post pressurizing material;

FIG. 16 is an internal view of an exhaust pipe having rear surfaces of the aerodynamic elements lining the walls provided with post pressurizing material;

FIG. 17 is a partial elevational view of a rear surface of a submarine equipped with post pressurizing material;

FIG. 18 is a partial view of a rear surface of a propeller blade provided with post pressurizing material;

FIG. 19 is a perspective view of an alternative embodiment of a post pressurizing material;

FIG. 20 is an exploded view of a layered orientation of the post pressurizing material of FIG. 19;

FIG. 21 is a perspective view of the layered system of FIG. 20 applied to the rear of a vehicle;

DETAILED DESCRIPTION OF THE PREFERRED INVENTION

At the outset of this description, it should be understood that the present invention provides a solution to the alleviation of the tremendous amount of drag developed at the rear portions of vehicles and other objects moving through fluid as more fully disclosed in the Background of the Invention. In addition to the representative applications shown in the accompanying drawings, further applications which are discussed below but not illustrated are also considered to be included within the purview of the invention.

Referring to FIGS. 1-4, thereshown are several forms of post pressurizing material 10 embodying the present invention. In each case, the post pressurizing material 10 commonly comprises an air-accumulating collection of dense, flexible elements 12 oriented into generally upright direction, and positioned upon a flexible, thin, flat mounting base 14 which can easily be attached to the rear surface of a body 16 (FIGS. 5-13) moving through air. The movement of the untreated body 16 normally causes a huge forward pressure dragging along a large volume of air in addition to a sizable suction area with competing low pressure at the rear of a body 16, all of which results in a motion-impeding drag.

Figure 1:
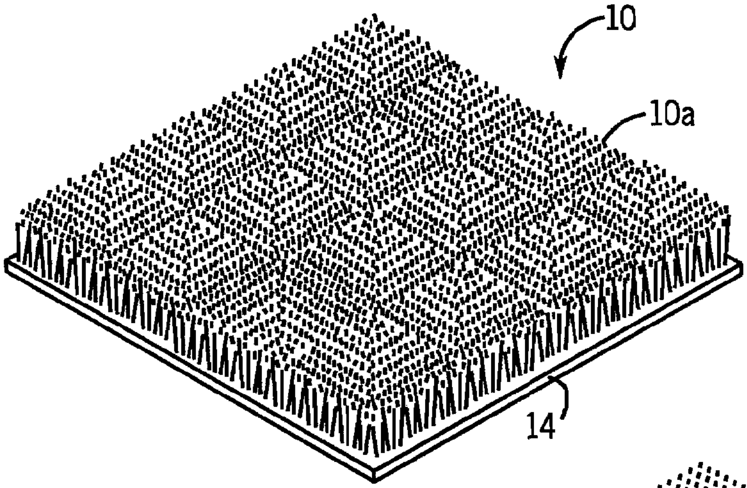
FIG. 1 is a perspective view of one type of post pressurizing material embodying the present invention.

The preferred form of post pressurizing material 10*a* in FIG. 1 is a furry mass comprised of soft, substantially round, fine elements freely bendable in all directions when subjected to an air stream but not flattened. The elements 10*a* shown are mounted on a flexible base 14, such as cloth, which is mechanically, adhesively or otherwise attached to the rear surface of the body 16. In the preferred embodiment and the embodiments to follow, the elements 10*a* and the base 14 are shown in a generally square configuration. However, it should be noted that the post pressurizing material 10 may be sized in any length, width or height desired, and can be provided in strips, sheets, rolls etc. of various colors and textures which conform to the desired surface.

Figure 2:
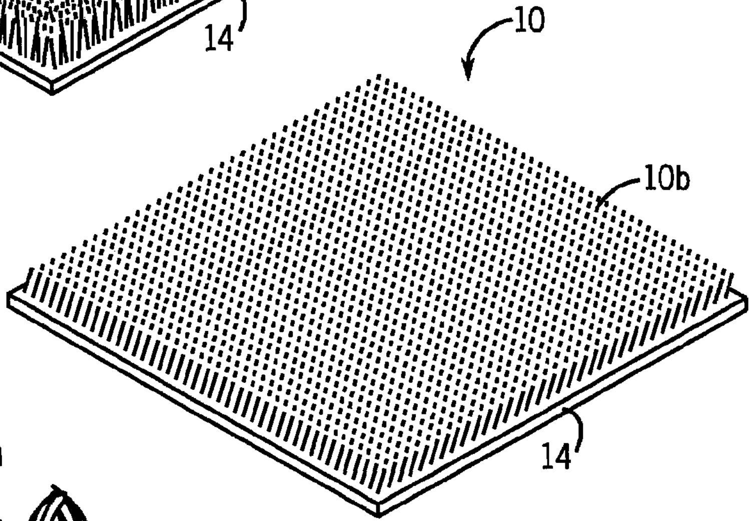
FIG. 2 is a perspective view of a second type of post pressurizing material.

FIG. 2 illustrates an alternative post pressurizing material 10*b* wherein the elements are comprised of a flat, textured paint applicator having a group of short, soft cloth or synthetic bristles which have a slight angularity from vertical as they project upwardly from base 14. These bristles may have a slightly greater rigidity and spring behavior than the furry mass shown in FIG. 1.

Figure 3:
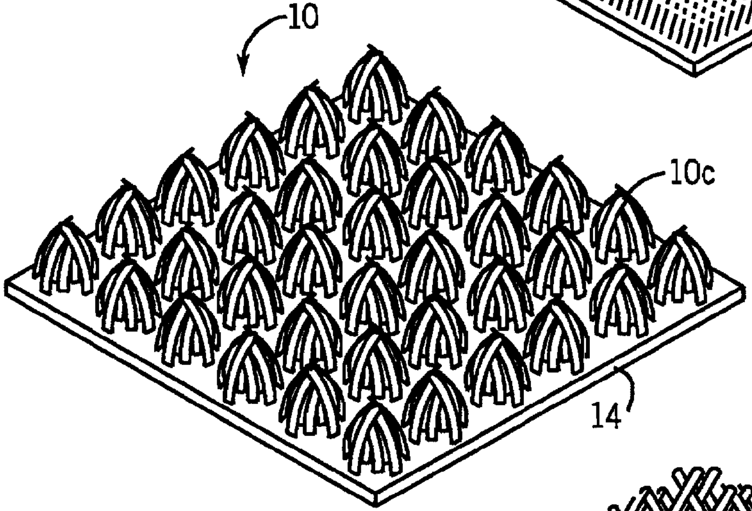
FIG. 3 is a perspective view of a third type of post pressurizing material.

FIG. 3 shows another form of post pressurizing material 10*c* in which the elements are a maze of curly, intertwined clusters made of plastic which are durable and washable and mounted on base 14.

Figure 4:
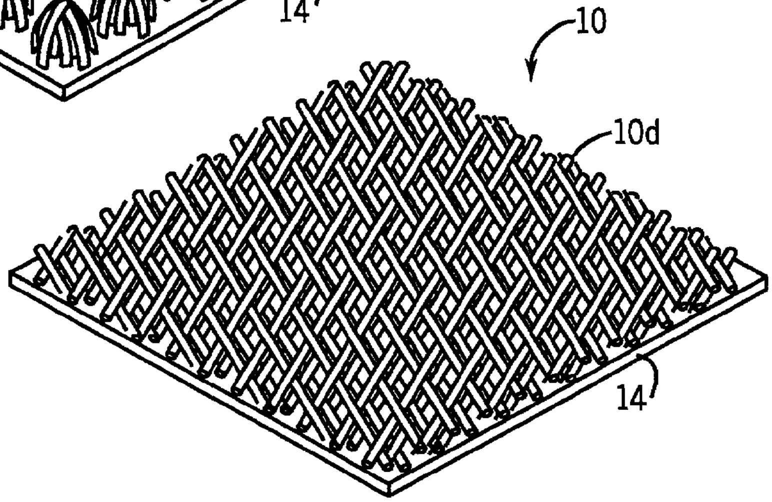
FIG. 4 is a perspective view of a fourth type of post pressurizing material.

FIG. 4 depicts another style of post pressurizing material 10*d* in the form of a plastic or nylon net in several overlapping layers disposed on base 14.

Each one of the post pressurizing materials 10*a*-10*d* is designed to entrap air flowing towards the rear of a body 16 in layer upon layer so as to convert the aforementioned suction area into an accumulated pressure area which will advantageously push the body 16 forward while offsetting the drag.

Figure 5:
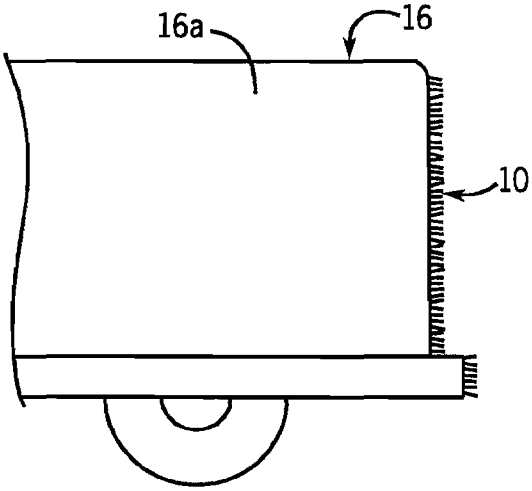
FIG. 5 is a partial side view of a rear surface of a van or truck having the post pressurizing material applied thereto.
Figure 6:
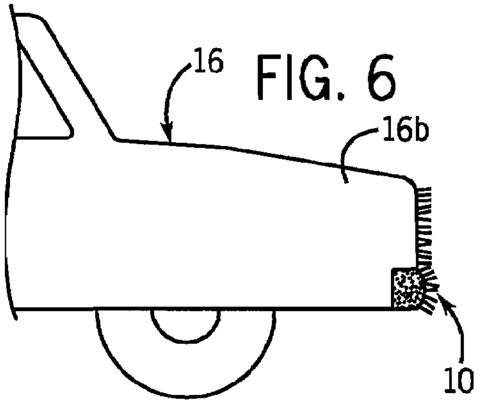
FIG. 6 is a partial side view of the rear surface of a car having the post pressurizing material applied thereto.

FIGS. 5-8 show typical applications of the post pressurizing material 10 to the rear surface of several vehicles. In FIG. 5, substantially the entire rear vertical surface of a van or truck 16*a* is covered by a post pressurizing material 10 with the elements directed into the airflow. In a large truck or semi-trailer 16*a*, the post pressurizing material 10 responds to airflow from the long sides and top of the vehicle. In FIG. 6, the post pressurizing material 10 is attached to the generally vertical rear surface of a car 16*b*.

Figure 7:
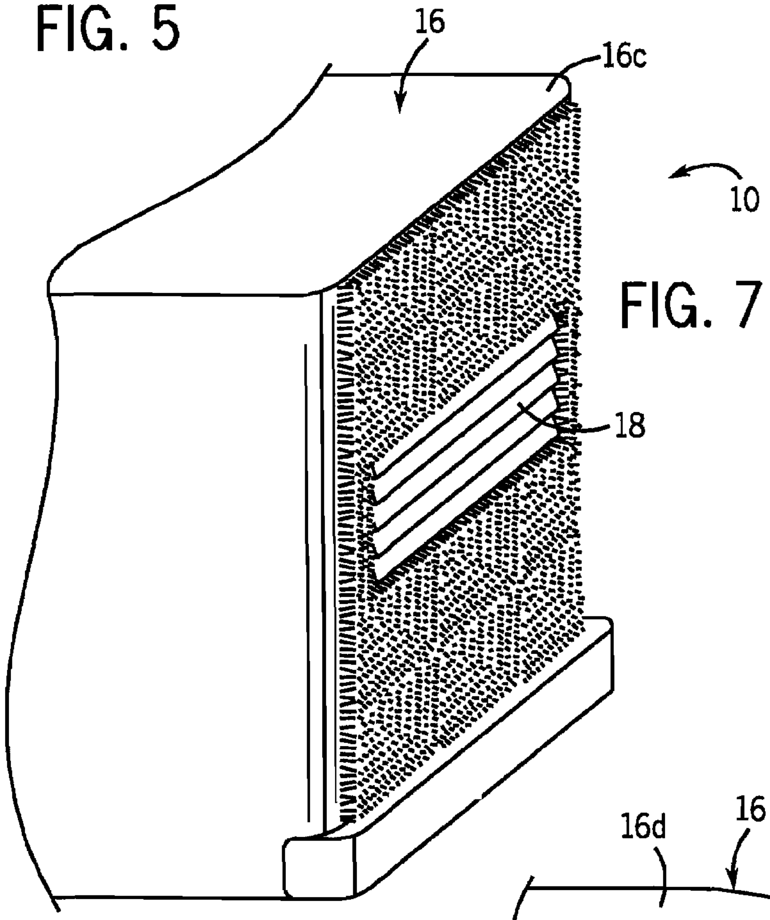
FIG. 7 is a partial perspective view of the rear surface of a bus having the post pressurizing material applied thereto.

FIG. 7 shows the post pressurizing material 10 applied to substantially the entire rear vertical blunt surface of a bus 16*c* except for a central heat or exhaust vent 18. Since the shape of the bus 16*c* is dictated by passenger space and luggage storage, a largely rectangular profile is unavoidable. As a result, the bus 16*c* has a larger airflow surface than many vehicles, and is expected to show a much larger drag reduction and supplemental propulsion when provided with the post pressurizing material 10. The bus 16*c* will be able to travel at higher speeds and with a commensurate savings in fuel.

Figure 8:
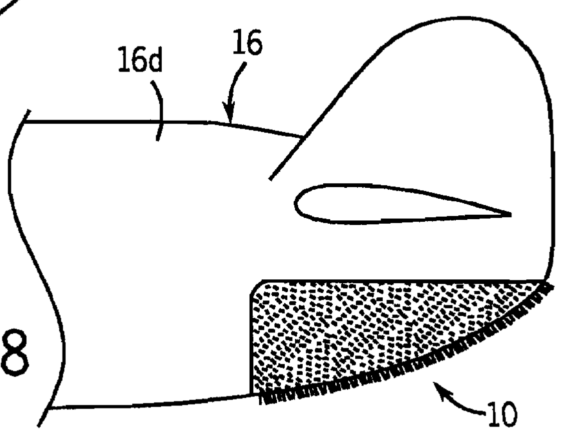
FIG. 8 is a partial side view of the rear surface of an airplane tail having the post pressurizing material applied thereto.

In FIG. 8, the receding lower portion of the tail section of an airplane 16*d* is shown equipped with the post pressurizing material 10. Although not shown, it is contemplated that the post pressurizing material 10 could also be effective in drag reduction on an aircraft when applied to the rear portion of the external surface of a jet engine.

In each application of the post pressurizing material 10 on the rear surface of motor-driven vehicles, not only is there an accumulated pressure that pushes against the rear smooth surface and voids the suction area normally applied thereto to reduce drag, but there is also realized a measurable savings in fuel consumption.

Besides being applied to vehicles, the post pressurizing material is also useful in reducing drag when installed on the rear surface of other objects moving through air. In FIG. 9, the post pressurizing material 10 is secured to the rear of a shaft 16*e* and the rear surface of a golf club 16*f*.

FIGS. 10 and 11 are illustrative of the use of post pressurizing material 10 on the rear outerwear 16*g* of a moving individual, namely the portions covering the back, the seat, the hamstrings and the lower rear legs. Application could also be made to the back of the individual's particular footwear. Such modified outerwear 16*g* is intended for runners, skiers, skaters, etc. as well as for bike riders, motorcyclists and the like. Use of the post pressurizing material 10 will be able to increase the moving performance of the individual.

FIG. 12 shows a post pressurizing material 10 joined to a rear area on the suction face of a blower blade 16*h*. A similar application may be made on fan or helicopter blades.

FIG. 13 illustrates a set of spaced apart, truncated aerodynamic elements 16*i*. Elements 16*i* are arranged in parallel across lateral surfaces of a body to increase the efficient movement of the body through air and other media. Each element has an upwardly curving nose 16*j* which is connected to a vertical rearward wall 16*k* depending from the back end of the nose 16*j*. Elements 16*i* are shown as being joined by connections 16*l*. Testing has shown that the rearward wall 16*k* accumulates forward pressure which exceeds rearward pressure on the nose 16*j*. It is believed that the elements 16*i* will by themselves greatly reduce drag and have various applications including vehicle hoods, tops, airplane fuselages and wings, fan and propeller blades, the exterior of both boats, truck wind deflectors, etc. To enhance the drag reducing effect, post pressurizing material 10 is applied to the rearward wall 16*k* of the elements 16*i* and/or the connections 16*l* between the elements 16*i*.

Although not shown, the application of FIG. 13 could be used on the rear external portion of a jet engine on an aircraft. This application could be used in combination with the use of the unmodified elements 16*i* on the internal surfaces of the jet engine to improve the output of the engine as well as the aerodynamic performance of the air frame. Also not shown and embraced by the present invention is the application of the elements 16*i* shown in FIG. 13 in reverse orientation along the sides of a ship to reduce drag from wind and water.

FIG. 14 illustrates a portion of a vehicle 20 employing a single enlarged aerodynamic element 22 mounted on a hood 24 in advance of the bottom 25 of a windshield 26. It has been found that drag on the lower portion of the windshield 26 is reduced by 30 percent or more using element 22 by itself. It is believed that placing post pressurizing material 10 on the rear surface of element 22 will further reduce drag and improve fuel economy.

FIG. 15 shows post pressurizing material 10 applied to the rear surface of a boat 28 above the water line for the purpose of reducing drag and providing supplemental propulsion.

FIG. 16 represents an internal view of an exhaust pipe 30 having internal surfaces provided with spaced apart aerodynamic elements 32. Rear surfaces of the elements 32 are provided with post pressurizing material 10. The exhaust pipe 30 is designed so as to provide a measure of jet propulsion, increase the power delivered by the engine and simultaneously save fuel and possibly eliminate the need for a muffler since sound vibrations may be muffled by air reversals along the aerodynamic surfaces.

It should be noted that use of the post pressurizing material is not restricted to use in air flow alone but also is applicable to water flow. For example, FIG. 17 shows the application of post pressurizing material 10 on the tapered rear surface of a submarine 34. FIG. 18 depicts the use of post pressurizing material 10 on the rear tip of a propeller blade 36 used in water. It is believed in these applications that drag is minimized by retaining a layer of water that is constantly maintained by naturally existing currents.

FIGS. 19-23 illustrate further alternative embodiments of post pressurizing material in the form of layered systems of alternately oriented, interstitial gridwork 38 applied to the rear surfaces of vehicles with a peripheral space or border around them.

FIG. 19 shows gridwork 38 in the form of an aluminum screen 40 having air-deflecting screen members 42 for guiding air therethrough and dividers 43. Applicant has found that drag reduction can be improved by using a stacked or layered system of multiple screens 40 as shown in FIG. 20. Here, the first screen 40*a* has vertically-oriented members 42 the second screen 40*b* has horizontally-oriented member 42, the third screen 40*c* has vertically-oriented members 42 and the fourth screen has horizontally-oriented members 42. Optimum drag reduction is obtained by attaching the layered system of screens 40*a*-40*d* to the rear of a vehicle 44 with a peripheral space 46 surrounding the layered gridwork 38 as seen in FIG. 21. Although not shown, the gridwork 38 could be hinged to the rear of the vehicle 44 to facilitate cleaning if desired.

Figure 22:
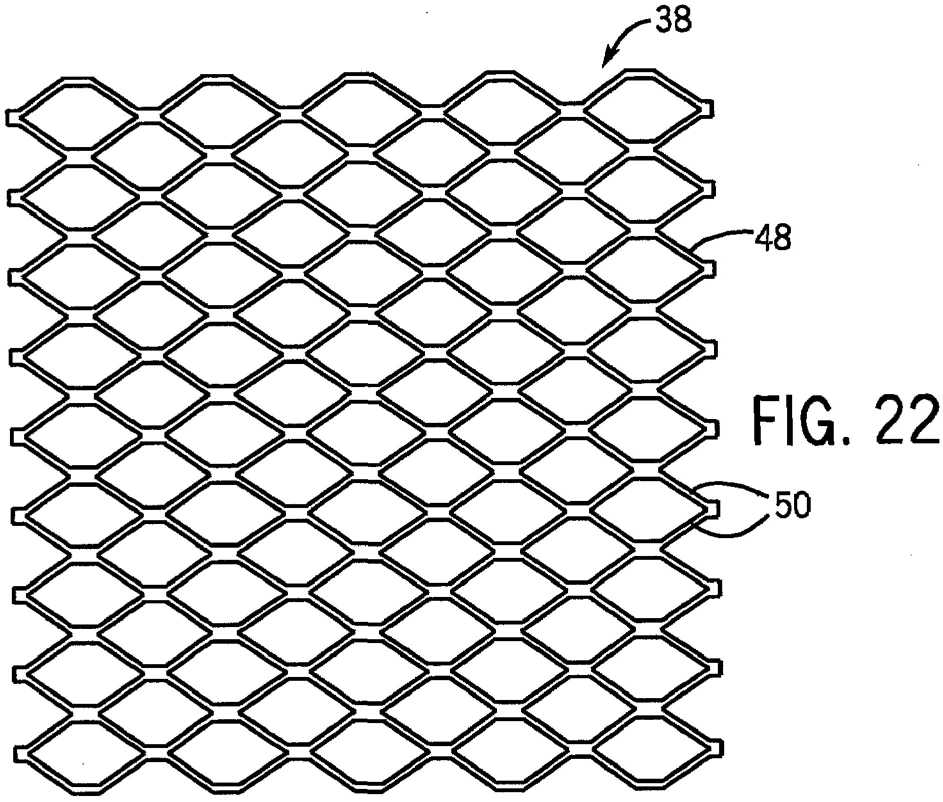
FIG. 22 is a perspective view of a further alternative embodiment of a post pressurizing material.
Figure 23:
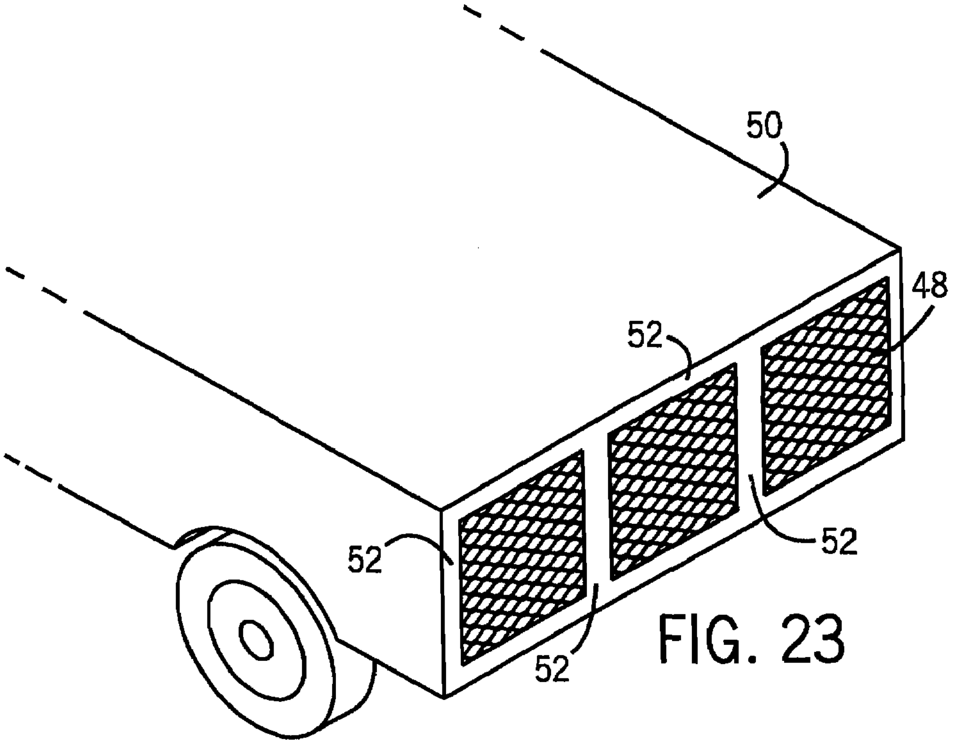
FIG. 23 is a perspective view of a layered system of FIG. 22 applied to the rear of a vehicle.

FIG. 22 shows a differently styled gridwork 38 in the form of an expanded metal screen 48 having air deflecting members 50 that are somewhat honeycombed in shape. FIG. 23 represents a layered system of three alternately oriented screens 48 attached to the rear of another vehicle 50.

Here, each of three layered systems are shown with peripheral spaces 52.

Optimal drag reduction is obtained with each layered system of FIGS. 21 and 23 due to the curvature of the variously oriented screen members 42, 50 which do not allow for free passage of air. Each surface builds a pressure on the inside and reaction on the outside, and the layered system helps to enable the buildup or accumulation of more and more pressure to create enhanced drag reduction and simultaneously provide a propulsive push on the rear of the vehicle 44, 50. The peripheral spaces 46, 52 around the layered gridwork systems prevent escape of the air so that more pressure can be accumulated.

The layered gridwork systems with peripheral spaces can be used in a variety of sizes, shapes and arrangements and can be dyed or painted to blend in with the color of the vehicle to which they are applied. It is contemplated that the screens are used in layers of at least two back-to-back screens with alternately oriented screen members. The screens may be fabricated from materials which will fit the contour of the particular vehicle.

FIGS. 24-28 illustrate further alternative embodiments of compartmentalized post pressurizing material disposed on the rear surface of a body.

Figure 24:
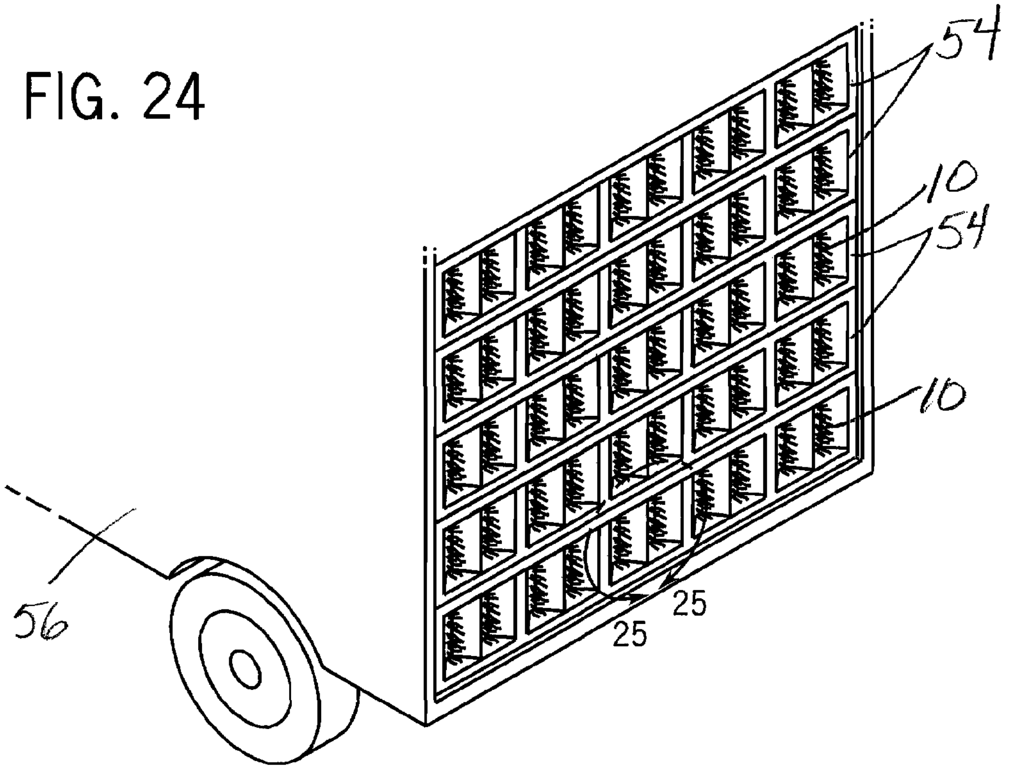
FIG. 24 is a perspective view of yet another alternative embodiment of a post pressurizing material arrangement applied to the rear of a vehicle.
Figure 25:
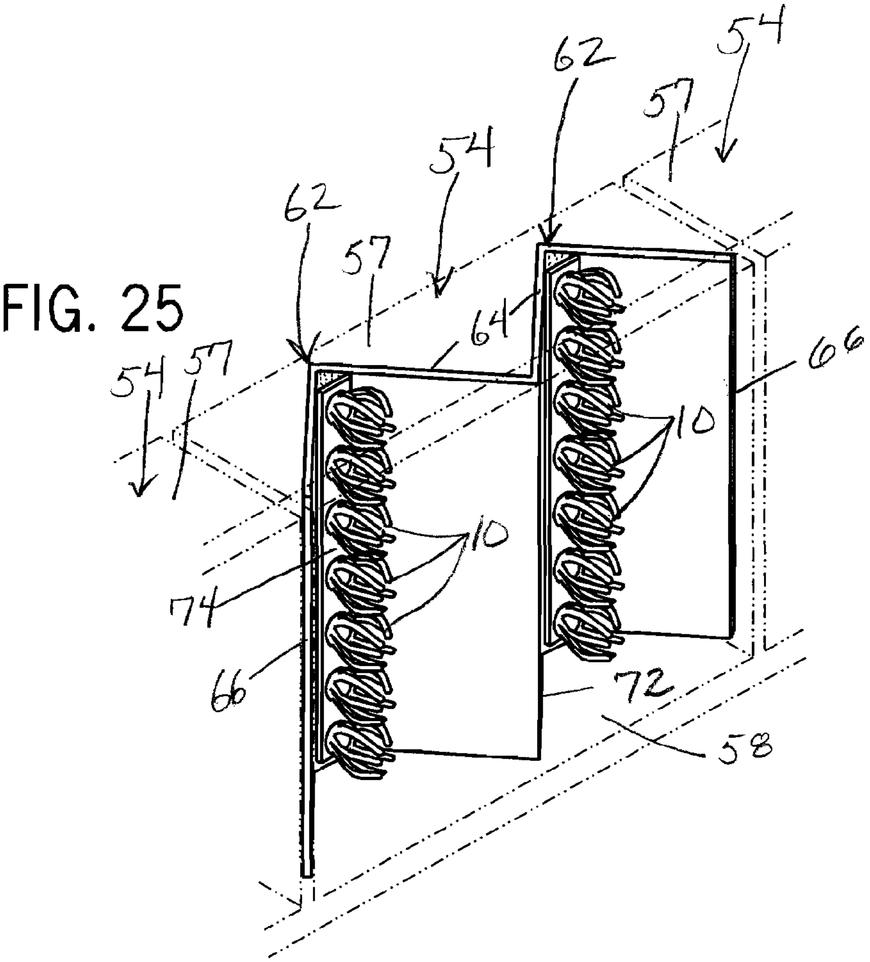
FIG. 25 is a enlarged view of a portion of the post pressurizing material arrangement taken on line 25-25 of FIG. 24.
Figure 26:
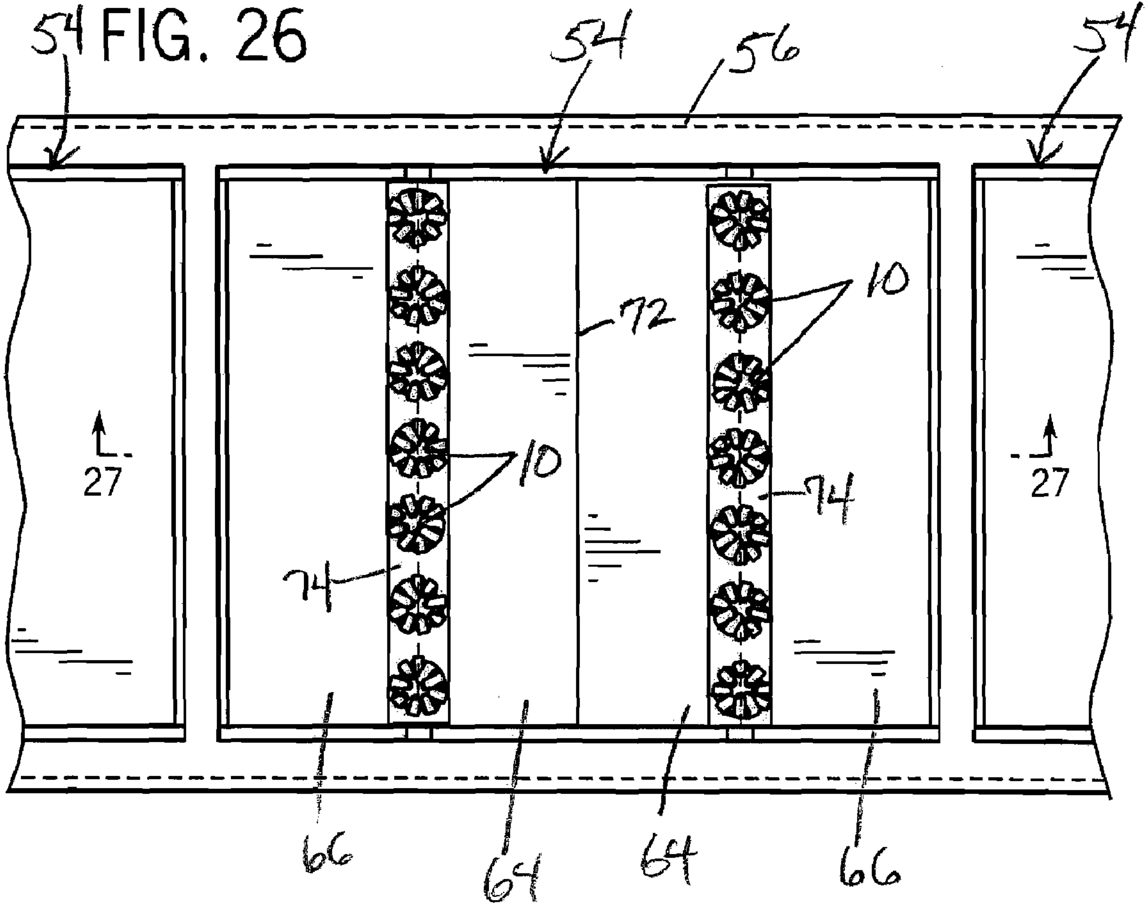
FIG. 26 is a front view of FIG. 25.
Figure 27:
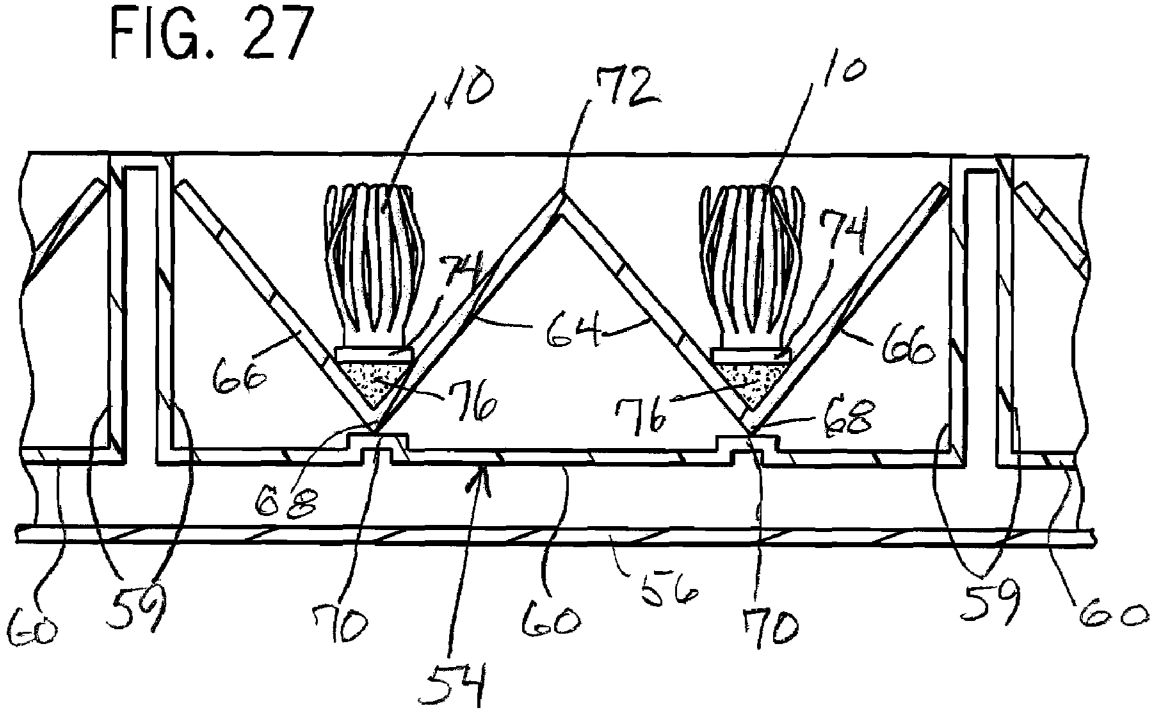
FIG. 27 is a sectional view taken on line 27-27 of FIG. 26.
Figure 28:
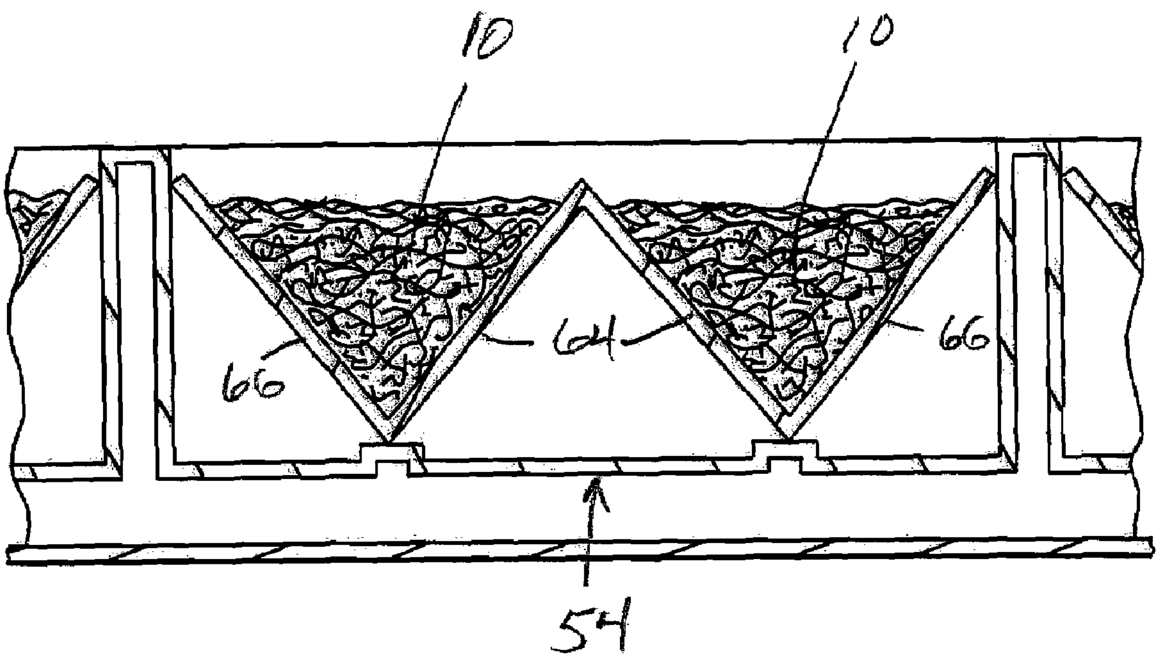
FIG. 28 is an alternative embodiment of FIG. 27.

FIG. 24 shows a series of continuous rows of joined compartments 54 adjacently disposed on the rear surface of a vehicle 56. As shown in FIGS. 25-27, each compartment 54 is sealed by a top wall 57, a bottom wall 58, a pair of side walls 59, and a front wall 60, but is open at its rear. Each compartment 54 is designed to retain therein a pair of V-shaped bases 62 with each base 62 formed by walls 64, 66 diverging outwardly from an apex 68 connected to a ridge 70 at the front of the compartment 54. In the preferred embodiment, the V-shaped bases 62 are connected together at 72.

Post pressurizing material 10 shown in the form of a group of curly plastic clusters having a common bottom 74 is positioned between walls 64, 66 and is typically secured to both walls 64, 66 adjacent the apex 68 of each V-shaped base 62 such as by an adhesive 76. It should be understood that the post pressurizing material 10 may take various forms such as illustrated in FIG. 1 or may be of other densely fiber material. Although not illustrated, the post pressurizing material 10 could also be attached to only one wall 64 or 66 of the V-shaped bases 62.

In FIGS. 24-27, the post pressurizing material 10 is spaced from the walls 64, 66 as it extends outwardly. However, in an alternate embodiment shown in FIG. 28, the post pressurizing material 10 substantially fills the space between the walls 64, 66 of the V-shaped bases 62 and is attached thereto.

In use, it is known that the movement of untreated, flat, smooth rear end surfaces of the moving vehicle 56 normally causes a huge forward pressure dragging along a large volume of air in addition to a sizable suction area with competing low pressure, all of which result in motion-impeding drag.

With the present invention, air flow swirling from the top, bottom and sides at the rear of the vehicle 56 becomes trapped by the post pressurizing material 10 in the compartments 54 which are shaped to convert the aforementioned suction area into an accumulated pressure area which will advantageously create a forward pressure on walls 64, 66 and push the vehicle 56 forward. As a result, the invention converts drag on the rear surfaces of the vehicle 56 to a propulsive force which is realized in greater speeds of the vehicle and increased miles per gallon in fuel efficiency.

While FIGS. 24-28 show the invention as applied to the rear surface of the vehicle 56, it should be understood that the compartmentalized post pressurizing material could also be used on many other applications.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

I claim:

1. In a body moving through a fluid and having a front surface accumulating positive pressure and a rear surface developing a negative pressure as fluid impacts upon the body creating significant drag thereon, the improvement comprising:

a series of compartments joined to the rear surface of the body, each compartment being sealed by a top wall, a bottom wall, a pair of side walls, a front wall and being open at a rear end thereof, each compartment retaining at least one V-shaped base having diverging walls opening into the rear end of each compartment; and post pressurizing material secured in a space between the walls of the V-shaped base for trapping fluid flow and accumulating forward pressure between the walls of the V-shaped base so to reduce drag and propel the body forward.

2. The improvement of claim 1, wherein each compartment holds more than one said V-shaped base.

3. The improvement of claim 1, wherein the post pressurizing material partially fills the space between the diverging walls of the V-shaped base.

4. The improvement of claim 1, wherein the post pressurizing materials substantially fills the space between the diverging walls of the V-shaped base.

5. The improvement of claim 1, wherein the post pressurizing material is comprised of a maze of curly plastic clusters.

* * * * *